Aug. 15, 1944.   J. O'D. SHEPHERD   2,355,607
CONTROL SYSTEM
Filed March 25, 1940   2 Sheets-Sheet 1

INVENTOR
Judson O'D Shepherd

Patented Aug. 15, 1944

2,355,607

UNITED STATES PATENT OFFICE

2,355,607

CONTROL SYSTEM

Judson O'D. Shepherd, Atlanta, Ga.

Application March 25, 1940, Serial No. 325,721

8 Claims. (Cl. 177—337)

My invention relates in general to control systems and more particularly to systems for controlling remotely disposed mechanism by radiated energy.

One objective of my invention is to provide means whereby street traffic control signals can be controlled by energy radiated from a vehicle. Emergency municipal vehicles such as fire apparatus, ambulances and police cars generally have the right to cross signal controlled intersections with the stop signals set against the direction they are travelling, depending for protection on the sound of a siren, bell or the like. Due to impaired hearing or inattention, serious accidents have occurred due to drivers on the cross street seeing a "go" signal indication and proceeding in front of the emergency vehicle. By means of my invention, the emergency vehicle can be provided with an energy radiating element and a detector provided at the intersections so that when the vehicle approaches an intersection the detector will be actuated by the radiator to cause the signals to be changed to indicate stop or caution in the direction of the cross street and, if desired, to the thoroughfare along which the vehicle is proceeding.

With this general objective set out, it will be seen that my invention can be used for various applications, particularly where control of remote mechanisms or devices from a moving vehicle is to be effected. This would include the protection of railroad and highway crossings, the turning on of landing field lights by an approaching airplane, opening garage doors, and turning on and off "whiteway" or other street lights by a properly equipped vehicle driving along it. It also follows that control operations can be effected on a moving vehicle from a fixed point or from another vehicle.

There are other objects and applications of my invention which, together with the foregoing, will be understood from the detailed specification which follows. I shall limit said specification and drawings principally to the operation of traffic control signals since this will be illustrative of the principles involved and other applications will be understood therefrom by those practiced in the arts.

The principal difficulty to be overcome with arrangements seeking the general objectives set out above is that of protecting the facilities from mischievous or false operation by energy received from extraneous sources. While my invention can employ any one of several types of radiated energy, it will be sufficient to illustrate this particular problem and the general method of its solution disclosed herein by assuming that sound energy is employed. This will require a sound actuated mechanism at the street intersection with a sound radiator on the vehicle. Street intersections are well known to be noisy, so it is necessary to make the sound responsive mechanism inoperative from street noises irrespective of their magnitude, but responsive to the sound radiated from the vehicle. I propose to effect this by causing the vehicle to radiate a sustained sound of a type that is not present in street noises. To do this I employ a siren, horn or other appropriate means which produces a note of a fixed fundamental pitch with said pitch interrupted or modulated at a predetermined frequency. Solely for illustration and in no wise limiting the pitch or the frequency of interruption or modulation which I may employ, assume that the fundamental pitch of the horn is 1,000 cycles per second and the interrupting frequency is 135 cycles per second. The sound responsive device or detector, as I shall subsequently refer to it, is tuned to be responsive, in this illustration, to a pitch of 1,000 cycles a second and will not be responsive to other frequencies. As a result of this, all street noises except those of this pitch will not affect the detector. As a part of, or associated with, said detector will be means responsive to 135 cycle energy to effect the signal changes. Viewing the detector analogously, it can be considered as two filters, the first passing 1,000 cycles per second and the second passing 135 cycles, to operate signal control mechanism, so all sounds of pitch other than 1,000 cycles per second are rejected by the first filter and the second rejects all low frequency components except 135 cycles, so it requires this particular combination and no other to effect the signal operation. Such a selective device would be substantially proof against inadvertent or mischievous operation, since a sustained tone of this combination of frequencies probably would not normally occur in street noises and would present difficulties to simulation by the unpracticed.

Referring now to the drawings which comprise Figures 1 to 8, inclusive, I have shown, by means of conventional diagrams, apparatus and circuits for carrying out my invention.

Figure 1:
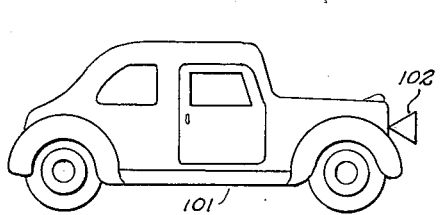
Figure 1 shows a vehicle provided with an energy radiator of suitable type.

Figure 1 indicates a vehicle 101. It has suitably mounted on it an energy radiator 102. This radiator is merely illustrative and not structurally indicative, the particular types of radiators which I may elect to employ in practicing my invention will be described below. While an automobile has been indicated, it will be understood that it is merely representative of vehicles of whatever type, including trucks, ambulances, electric trains, locomotives, street cars, boats, airplanes, or the like. A suitable switch or other appropriate means is contemplated to make radiator 102 operative or not under control of the driver of the vehicle. The radiator can be located at any appropriate place on the vehicle or made a structural part thereof.

Figure 3:
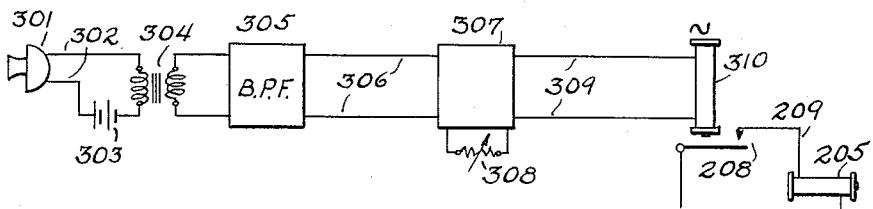
Figure 3 shows intersection apparatus which may be used for the embodiment of my invention employing sound as the radiating energy.

Figure 3 illustrates the general application of my invention to a signal controlled intersection. Signal lights at such an intersection are indicated by 202 and 203, which, respectively, control the traffic on the two streets of the intersection. While I have indicated signals of the familiar type which comprise lamps with red, green and amber lenses to indicate stop, go and caution, respectively, it is quite immaterial to my invention what type of signals are employed. Other numbers of signal assemblies and different arrangements thereof can be employed, as will be understood.

An intersection signal controller is represented by 212. Six circuit actuators 204 are operable by suitable means to close operating circuits for the several signalling lamps. The controller indicated by 212 may be of any suitable form since it is immaterial to my invention what type is employed. It can be a simple motor driven flasher to effect cyclical operation of the signals, such as shown by the Vickery Patent 1,701,-399, or a centrally controlled one of which Shepherd No. 2,173,596 is illustrative, or the traffic actuated type of which that of Von Opel in Patent No. 2,126,431 is illustrative, or the type whereby a central controller, such as that of Vickery, supra, is employed with the signal lamps at the several intersections connected in multiple to the several signal operating conductors. It is sufficient for the purposes of my invention that the signals be operated for the control of traffic by appropriate means. It also will be apparent that in some applications of my invention the controller 212 may be omitted.

A relay 205 has contacts connected in the signal operating circuits in such manner that with said relay in its normal or released condition the signals can be operated by the controller 212. With relay 205 operated, it will be seen that the signal lamps will be disconnected from the controller and by means of front contacts 206 and 207, the red lamps in both directions will be lighted over obvious circuits from power terminals 210, which are connected to a suitable power supply.

The detector 201 is of such character that it will be responsive to the particular type of energy with proper characteristics transmitted by, or radiated from, an appropriately equipped vehicle and, upon receiving said energy, will close contacts 208 to complete a circuit from one of power terminals 210 over conductor 209 to operate relay 205 to cause the red or stop indication to be displayed to traffic on both streets.

It will be apparent that relay 205 can be employed to effect control operations other than the specific one set out above by obvious wiring changes or different contact assemblies, or both. For example, I can arrange it to cause amber to be displayed in all directions, or both amber and red. It also follows that in applying my invention to intersections having supplemental signals such as arrows to indicate that vehicles may turn, or pedestrian crossing signals, or the like, I may elect to extinguish said signals upon the operation of relay 205 by extending the operating circuits therefor through normally closed contacts of said relay. By adding additional contacts I can, of course, cause relay 205 to light supplemental signals, as for example, one to display the word "Fire" to traffic. By providing motor driven interrupter or flasher contacts in the circuit at the point indicated by X, designated 211, I can cause the signals displayed upon the operation of 205 to flash. It will be further apparent that I can employ various combinations of the signal operations set out above.

Figure 4:
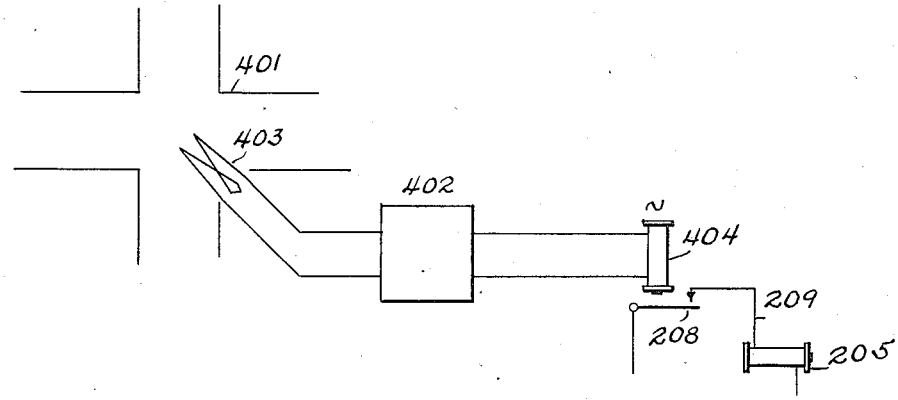
Figure 4 shows intersection apparatus which I may employ in connection with radio energy for effecting the signal operations.

It is obvious that I may incorporate the principles set out above into, and make them a part of, the intersection controller, instead of arrangements external thereto. The particular arrangements will depend, of course, on the particular type of signal controller employed. It is deemed unnecessary to examine the entire art of traffic control to show how this feature could be incorporated in the various types of controllers disclosed therein, so only certain illustrative ones will be considered. It is immediately obvious that controllers with a relay operable from a central point to cause red (or amber) lamp displays in all directions can be arranged to have said relay operable by a local circuit controlled by contacts 208. Application to other systems whereby said red, or other, displays are controlled from a central point without the use of a separate relay can be illustrated by reference to Shepherd Patent No. 2,173,596 as an example. Figure 4 thereof shows means for securing several resets by positioning reset drum C, including red indication in all directions when said drum is in position 4, as more clearly shown by Figure 3. This is effected from the central station by transmitting current over conductor 04 when the pin on drum 418 closes its associated contacts. This causes said current to be transmitted through contacts of drum 457, self interrupting contacts of stepping magnet 473, the common return conductor to the other power terminal at the central station. Magnet 473 will repeatedly operate and release until shaft C reaches position 4, to cause the desired signal display. It is apparent that this operation can be effected with my invention by the obvious means of having contacts 208 of Figure 2 complete a local circuit through contacts of 457 to operate 473 as described in said patent. These contacts could also operate an auxiliary relay to open the reset lead 04 immediately above the contacts associated with drum 416, to prevent the resetting impulses being effective while contacts 208 are closed. When the latter contacts are opened after the passage of the vehicle, the next resetting impulse will cause drums C to be revolved back to the position which they occupied before the all red indication was shown. This assumes that a resetting impulse is transmitted each cycle as set out in this patent.

It will be obvious that late at night when the traffic signal system is shut down, a vehicle appropriately equipped will cause stop or caution indications to be displayed at intersections with signals which it approaches, and will thereby protect its passage through said intersections.

In practicing my invention I may elect to provide a time delay feature whereby the change of signal lamps under control of an approaching vehicle will be delayed for a short interval. This would tend to prevent a short impulse of energy of the proper type from an extraneous source effecting the signal change. Any suitable time delay means could be used. One obvious means to accomplish this would be to employ a slow operating relay 205, which could be any one of several types known to the art, including those employing a dash-pot or bellows, or the type with a copper sleeve or slug over the core. Likewise, I could make an element of detector 201 of such type that contacts 208 would be closed after an interval, as will be understood from the description which follows.

In certain embodiments of my invention it may be desirable for the signal condition to be continued for an interval after energy from the vehicle ceases reaching the detector in sufficient magnitude to maintain it operated. This can, of course, be effected by making relay 205 and/or contacts 208 slow to release by any suitable method, or other appropriate means.

In some applications of my invention it might be desirable to have the signals operated differently depending upon which direction the vehicle approaches the intersection. This can obviously be accomplished by having a plurality of detectors 201 at each intersection, each of such type that it will be directionally responsive so that each will be operated only by energy received from a predetermined direction. A separate relay 205 individual to, and operated by, each detector will be appropriately connected so that the operation of any one will disconnect the signals from controller 212 and light certain signal lamps as predetermined by connections to contacts of the operated relay, as will be understood from what has been described above and that which is to follow.

The above described arrangements are applicable to various of the embodiments of my invention set out below. In several of the figures of the drawings relating thereto, contacts 208, conductor 209 and relay 205 will be indicated, or relay 205 alone, it being understood that the operation of the latter will effect one of the signal operations set out above.

In practicing my invention I may elect to employ any one of several types of radiable energy to effect the closure of the operating circuit for relay 205. Certain of the means for employing the several types of energy contemplated will now be considered in detail.

Sound

With the embodiment of my invention using sound waves as the operating energy, I will employ a horn, whistle or siren, or other device capable of producing a sustained note of suitable pitch and volume, with said note modulated or interrupted a particular number of times per second as the source of energy. Inasmuch as vehicles of the type considered normally employ a horn or siren, I may elect in point of economy to employ a source of sound on the vehicle which can serve the double purpose of giving audible indication of the approach of the vehicle and controlling the actuation of the intersection detector. It will be assumed that its pitch is 1000 cycles per second and said pitch will be interrupted 135 times a second. This combination of frequencies will be referred to hereinafter as the "tone." It will be understood that this particular tone is selected arbitrarily for descriptive purposes and may comprise any other combination of frequencies within a wide range including a primary pitch above the audible range, or supersonic.

Figure 7:
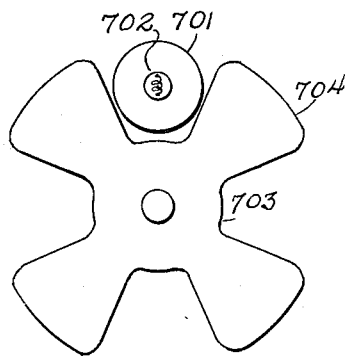
Figure 7 shows one means for mechanically interrupting or modulating sound from a source or a beam of light or energy of wave length near that of the visible spectrum.

The particular design of the energy radiator is not a part of my invention, it being sufficient to specify that it will produce the desired tone with appropriate accuracy. Figure 7 indicates one arrangement which may be employed. The element 701, in this embodiment, is the mouth or sound opening of a conventional horn, whistle or the like which produces an unmodulated train of 1000 cycle sound waves of the appropriate intensity. A wheel 703 is driven at an appropriate constant speed by a motor, not shown, so the blades 704, which are in close proximity of the horn, or the like, opening 701, interrupt or modulate the sound waves at a predetermined frequency to produce sound energy of the type appropriate for the operation of the detector and associated elements.

Another arrangement which I may elect to employ will comprise a horn with a diaphragm. The diaphragm and the air column of the horn will be tuned to resonate at the fundamental pitch of 1000 vibrations or cycles per second. A tapper will be provided to strike the diaphragm, said tapper being actuated by an electro-magnet with self interrupting contacts, as with the usual doorbell or buzzer. The tapper assembly will comprise a sprung pendulum with a natural period of 135 vibrations per second. This arrangement will result in the diaphragm being struck 135 times a second, and upon each impact a train of 1000 cycle sound waves will be produced.

Another obvious arrangement which I may use will be a speed regulated motor driven siren to produce a 1000 cycle note and have a revolving blade assembly to block or reduce the transmission of the note at the rate of 135 times a second.

Still another alternative will be to provide an air or vacuum jet horn of fundamental pitch of 1000 cycles, and to interrupt or modulate said jet mechanically 135 times a second.

By employing a lower interrupting frequency, a whistle with a light ball in its resonating chamber may be employed. This can be similar in basic design to the familiar whistle employed currently by policemen in the direction of traffic, whereby a pulsing note is produced. Other appropriate arrangements may, of course, be employed.

Let us now consider the apparatus required at the street intersections for this embodiment of my invention employing sound. Figure 3 shows provisions for one controlling unit. A sound responsive device 301 is provided, which is appropriately housed and mounted at the street intersection so that sound from the vehicle energy radiator will reach it. This device 301 can be a microphone, as indicated, or any other suitable sound responsive device which will control the flow of electric current in an external circuit, or generate a current in said circuit, in response to sound waves reaching it. This device will be considered hereafter, for illustration, as being a microphone. It is connected in the circuit comprising conductors 302, battery 303 and the primary of induction coil or transformer 304. The secondary of this induction coil is connected through band pass filter 305 which is designed to pass as nearly as may be the fundamental pitch frequency employed, 1000 cycles per second in this illustrative case. Consequently, the circuit including conductors 306 will carry only the 1000 cycle component of the current arising from sound picked up by the microphone. This last mentioned circuit extends to an amplifier 307, which is of conventional design and which I have not shown in detail since many suitable forms are in extensive commercial use. It amplifies the 1000 cycle current received over conductors 306 an amount determined by an adjustable gain control indicated as 308 provided to adjust the sensitivity of the receiving facilities as a whole.

Conductors 309 extend from the output of the amplifier to a relay 310 which is designed to be operated only by current of a predetermined frequency, say, 135 cycles per second, as assumed. A condenser, or other suitable arrangements, can be employed in connection with conductors 309 to block out the direct component of the amplified current, if I so desire. I may elect to arrange the amplifier 307 to block out the "carrier" frequency of 1000 cycles per second, permitting only current of modulating frequency to reach relay 310. This is a practice widely used in radio receivers whereby the carrier is suppressed or eliminated and the output to the loud speaker consists of the sound frequency currents. Such demodulation with this arrangement will result in transmission of 135 cycles current to relay 310.

It will be seen, therefore, that while the microphone or its equivalent is responsive to a wide range of sound waves, only current resulting from those of the assumed pitch of 1000 cycles a second will reach the amplifier 307. If, and only if, this 1000 cycle pitch has been modulated or interrupted 135 times a second will relay 310 operate. The current from any pitch other than 1000 cycles per second will not pass the filter 305, and any 1000 cycle pitch which does pass it will not be effective to operate relay 310 unless it has been modulated at 135 cycles per second.

Figure 2:
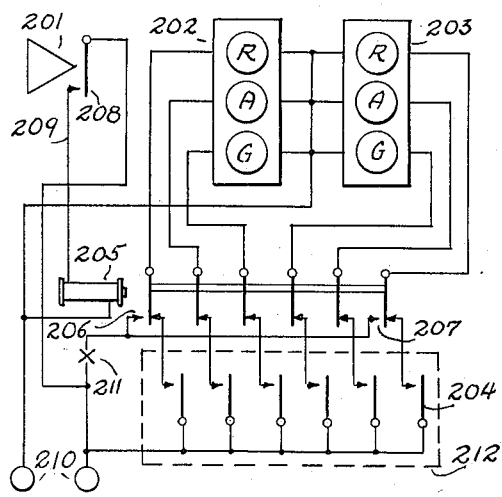
Figure 2 shows general arrangements provided at or near street intersections for controlling the signals with any of the several embodiments of my invention.

The operation of relay 310 will close contacts 208 to complete the local circuit to operate relay 205 to effect the signal changes as set out above in connection with Figure 2.

As stated heretofore, I may provide by familiar arrangements, which may include a dashpot or bellows, means to make relay 310 and/or 205 slow to operate to prevent a transient tone of proper combination of frequencies from effecting the stop indications. Commercially available relays designed to operate in response to a particular frequency and suitable for use as relay 310, employ an armature tuned to the specific frequency, said armature operating only after receipt of sustained current of said frequency to close its contacts. Such a relay, itself, will provide some delay to prevent operation of the signals from a transient tone.

There are many modifications in the details of the arrangement specifically shown as will be understood by those practiced in the art. For example, a battery 303 is indicated in the microphone circuit. An obvious alternative will be to use rectified current from an alternating local power source, or current directly therefrom through a resistance if a direct current power source is used. It is apparent that I may use a sound pickup device which will generate current in response to sound received by it, thereby eliminating those elements shown which are required by a microphone. By using a sufficiently sensitive relay 310, I may eliminate the amplifier. I may also elect to place an amplifier ahead of the filter instead of, or as well as, behind it in the circuit. I may also elect to provide a low frequency band pass filter in the circuit just ahead of relay 310. It also will be desirable in practicing my invention to employ a sound pickup 301 with its principal response to the pitch of the note. By employing one responsive solely to the pitch frequency the band pass filter 305 may be eliminated. An acoustical filter tuned to pass the employed pitch can, of course, be employed with other of the elements to limit response of the detector to the employed pitch.

Instead of employing a single modulation of the pitch of the sound by a simple frequency, I may elect to modulate it twice. For example, assume that the pitch employed is 2000 cycles. By suitable means on the vehicle, I may modulate this pitch 800 times a second and also 20 times a second. The receiving system for such an arrangement may contain a first band pass filter 305 for 2000 cycles and a second connected to it to pass 800 cycles and a relay 310 to operate on 20 cycles per second. The signal operation then will be effected by, and only by, a tone with these three components.

*Radio waves*

In practicing my invention I may elect to employ radio waves to be transmitted from the vehicle as the operating energy, and one arrangement of the receiving apparatus for effecting this is shown by Figure 4.

The vehicle, with this embodiment, will carry a low power transmitter tuned to a predetermined wave length. The carrier current will be modulated by a 135 cycle, or other appropriate, frequency which, in turn, can be generated by a vibrator or tuned oscillating circuit, as is well known to the art. I probably will elect to employ a carrier in the ultra-high frequency portion of the radio spectrum and employ a parabolic radiator attached to the front of the vehicle to direct the beam of radiation ahead of it. The details of such a transmitter are not shown since suitable types are well known to the art.

Referring now to Figure 4, a radio receiver 402 is provided at each intersection, said receiver being permanently tuned to the wave length employed with the vehicle radiator. Any appropriate receiver circuit can be employed since its design is not a part of my invention. It is sufficient to specify that it will receive radio energy of the proper wave length, demodulate it and supply at its output terminals an undulating or alternating current of the frequency used for modulating the carrier of the vehicle radiator, said current being amplified to a suitable level. A loop antenna is indicated as 403, which is oriented to be effective from all angles of approach to the intersection 401. Any other suitable antenna system may be employed or, with a sufficiently sensitive receiver, it may be omitted as a separate element.

The output of the receiver is connected to relay 404, which is of a type to be operated by and only by 135 cycle current, or whatever other frequency I may choose for modulating the carrier. The operation of relay 404 in response to energy from the approaching vehicle will close contacts 208 to operate relay 205 to, in turn, effect the operations described in connection with Figure 2.

It will be seen that very specifically conditioned radiant energy is required to effect the signal operation. The energy must, first, be of the proper wave length to affect the receiver and, second, it must be modulated at the proper frequency to operate relay 404. Such a specific condition is exceedingly unlikely to be produced inadvertently by extraneous devices. I may choose a carrier frequency which, in view of local conditions, will be unlikely to be interfered with by other sources of radiant energy. Appropriate time delay facilities can also, of course, be provided to prevent a transient of proper wave length and modulating frequency from operating the signal lamps.

I may employ a more complex modulation of the carrier than by a simple frequency such as 135 cycles assumed. I may, for example, modulate it by the tone assumed for employment with Figure 3, in which case the output of receiver 402 may be connected to a band pass filter such as 305 with the remainder of the elements to the right thereof in Figure 3, whereby the signal changes will result from the receipt of radio energy of proper wave length modulated by 1000 cycles a second which, in turn, is modulated by 135 cycles a second. The omission of any one of these components would prevent the signal operations being effected, thereby affording further protection of the system from inadvertent or mischievous operation. In practicing my invention with radio energy, I may elect to use a very high modulating frequency or frequencies due to the resulting simplification of the filter or blocking facilities required. By employing appropriate demodulating facilities in conjunction with receiver 402, relay 404 need not be an alternating current type.

*Light*

Figure 5:
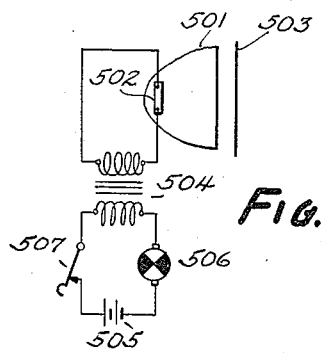
Figure 5 shows a vehicle radiator for effecting signal operations by projection of a beam of light, or the like, on the detector apparatus at the intersections.
Figure 6:
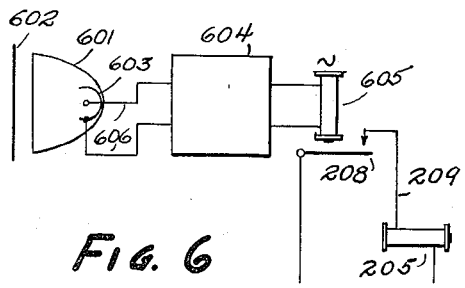
Figure 6 shows light responsive apparatus to be used at the intersections for operation by light from some such source as shown by Figure 5.

I may elect to use a beam of light of appropriate characteristics to actuate a suitable detector in certain embodiments of my invention. Figures 5 and 6 indicate one arrangement which I may employ. A vehicle light radiator is shown by Figure 5 with means to impart a particular characteristic to the beam of light therefrom to differentiate it from light ordinarily found on streets and highways. A parabolic or other suitably shaped reflector 501 has a light source 502 at its focus. The source 502 is indicated as a discharge tube of suitable gas content to result in substantially monochromatic light. I may also use a light filter 503 to assure a monochromatic beam. I may also use a lens on said reflector 501 to facilitate the production of a beam of suitable size.

A transformer or induction coil 504 is provided with the discharge tube connected in the secondary circuit. The primary is connected to battery 505 through closed switch 507 and an interrupter 506, said interrupter being driven by a motor, or operated by other means, not shown, at such speed, as to result in the interruption of the primary circuit at the assumed frequency of 135 cycles a second. This results in the light source producing a beam of substantially monochromatic light interrupted 135 times a second. I may elect to have the light source suitably mounted on the vehicle so that the beam can be manually directed toward the detectors as the vehicle approaches intersections.

Figure 6 shows one form of detector which I may employ with this embodiment, and comprises a parabolic reflector 601 with a filter 602 to pass light of the wave length transmitted by the vehicle. While the filter 602 and that of the vehicle 503 are shown external to their reflectors, it is obvious that they may be mounted inside of the front cover or lens of the reflectors. It also is obvious that the cover or lens can be made of such material as to act as a filter, so that a separate filter need not be provided. It is also apparent that with lenses to focus the light beam the parabolic mirrors of the vehicle and detector may be omitted.

A light responsive element 603 is provided at the focus of the detector assembly. This can be a photoelectric cell, as indicated, or any other light responsive element which will control or produce an electric current in response to light reaching it, and will be responsive to the interrupting or modulating frequency employed, assumed to be 135 cycles per second for illustration.

The light beam from an approaching vehicle will result in there being set up in the conductors 606 a current with a 135 cycle component. An amplifier 604 of suitable design amplifies this current to operate relay 605, which will operate on 135 cycle current. The latter closes contacts 208 to complete an operating circuit 209 for relay 205 to cause signal operations set out above. It is to be understood that proper potential is placed on conductors 606 by the amplifier 604 for the type of light responsive device 603 employed, if potential therefor is required.

It will be seen from the above, that the operation of the signals will result solely from a beam of light of proper wave length interrupted or modulated 135 cycles a second.

The arrangement shown requires a separate photo-responsive device for each direction of approach. In practicing my invention I may elect to use the obvious expedient of mirrors or prisms whereby a beam from a vehicle approaching the intersection from any direction will be reflected or refracted to a single photo-responsive device 603. I may also elect to provide a suitable hood or hoods for the detector assembly to substantially eliminate the light reaching the cell except from along the route or routes of approaching vehicles.

I may also elect to use a filament source of light which might not be responsive to modulation at the desired frequency. With such a source the beam may be physically interrupted or modulated, and one arrangement for affecting this is also shown by Figure 7. In this embodiment, 701 indicates a suitable reflector and filter assembly with an incandescent filament 702. The blades 704 are driven as previously described and are adapted to interrupt the beam at the proper frequency. While complete interruption of the beam is indicated by the blade design, it is to be recognized that this is not necessary. It will be sufficient to provide only such blade widths as will give sufficient variation or modulation of the intensity of the beam to result in an appropriate magnitude of the variable component of current flowing in conductors 606 to result in the operation of relay 605 of Figure 6.

The above description of Figures 5, 6 and 7 has been premised on the use of light, as such, implying that the beam of radiated energy will be in the visible spectrum. It is obvious that this is an unnecessary limitation and I may elect to use a beam with a wave length either above or below the visible portion of the spectrum by employing a suitable energy source, and/or filters and detecting means well known to the art. It also follows that by choosing a wave length which is not normally found in or on streets and surrounding structures, or vehicles, and using suitable filters, I may eliminate the modulating frequency altogether with the obvious simplification of my device. In this case, relay 605 need not be of a type to be responsive to alternating current, but will be responsive to current from the amplifier resulting from a beam of said wave length reaching the detector.

Polarized light provides a means for effecting the objective of my invention which I may elect to employ. The vehicle to be protected will be provided with a light of appropriate intensity polarized in a predetermined manner. One means for effecting this will be to provide a reflector assembly similar to the commonly used automobile headlight with a transparent medium in the light beam to polarize it. Among means to effect this are mediums disclosed in the Land Patents Nos. 1,956,867 and 2,078,254. A headlight to project polarized light is disclosed in the Chubb Patent No. 2,087,795. The Land Patent No. 2,099,694 discloses the use of circularly or elliptically polarized light. Either plane, circularly or elliptically polarized light may be employed, as I desire.

Figure 8:
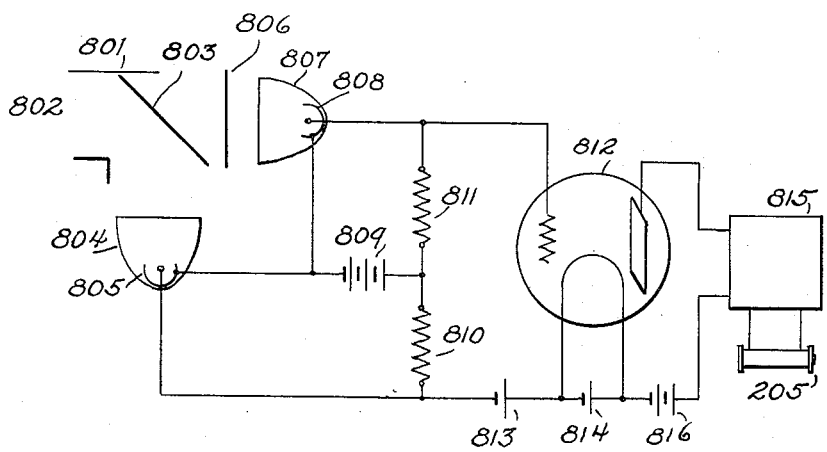
Figure 8 shows intersection apparatus to operate in response to polarized light or energy projected on it from a vehicle.

A form of detector which I may use with this embodiment of my invention is shown by Figure 8. A suitable housing 801, indicated in part, is provided with an opening 802 properly directed for admission of the beam of light from the vehicle. Reflecting means 803 is mounted at a suitable angle, say 45°. This reflecting means can comprise narrow strips of mirror like material, so that a portion of the light which reaches the assembly is reflected downward and part is allowed to pass through. That which is reflected downward is focused by reflector 804 on a photo-responsive device 805, indicated as a photoelectric cell. That portion of the beam which passes through the interstices of the mirror passes through a suitable polarizing medium 806, such as those disclosed by the above mentioned patents of Land, said medium being oriented or designed with respect to that of the vehicle so that polarized light therefrom will be substantially stopped by medium 806.

Light passing through this latter medium is focused by reflector 807 on photo-responsive device 808.

A suitable source of electric energy 809 is provided. The two cells are connected through resistances 810 and 811, respectively. An electronic tube 812 is connected across these two resistances, and has a proper grid biasing potential 813 and filament power supply 814. The plate circuit of the tube, including an appropriate potential source 816, extends to an amplifier 815 with the output circuit thereof extending to relay 205, which is the same as, or equivalent to, the similarly designated relay of Figure 2, and effects the same signal control function.

Let it be assumed that unpolarized light reaches the detector. It will actuate photo-cells 805 and 808 equally, so that current will flow through each of them. This will result in equal potential drops through resistances 810 and 811, inasmuch as the light reaching the two cells will be the same. In order to assure the equal actuation of the two cells from unpolarized light I may insert in the portion of the beam reaching 805 a translucent medium which will quantitatively pass the same amount of light as medium 806, or use other suitable means to adjust the response of the two cells. While the potential drops through 810 and 811 will be the same, it is to be noted that they will be in opposite directions. As a result of this, the potential drop through both resistances in series will be unchanged from the standpoint of the tube 812 connected across it. In consequence of this, the tube, which is appropriately biased, will not be effective under this condition of equal light reaching both photo-cells.

Now let it be assumed that a vehicle properly equipped to project a beam of suitably polarized light approaches, and this beam is directed into the detector. Due to the medium 806, practically none of the light of the beam reaches cell 808. That reaching cell 805 will cause a potential drop through resistance 810, to result in the potential on the grid of tube 812 being changed to cause current to flow in the plate circuit. This current, further amplified, will operate relay 205 to cause the signal operations set out above.

It will be recognized that the operation of the signal lamps results from a differential condition based upon means which will discriminate between light polarized in a predetermined manner and all other light. As a result of this, all sources of light other than those from vehicles to be protected will not be effective.

In practicing my invention, I will choose such an orientation or design of my polarizing medium 806 and the corresponding one on the vehicle that polarized light from extraneous sources will be unlikely to actuate the detector. In choosing this orientation and/or design, I will give consideration to the various probable sources of polarized light as, for example, the plane polarization resulting from the reflection of light from bright surfaces, and that from automobile headlights if the arrangement disclosed in the Chubb patent, supra, or the like is placed in commercial use.

The use of strips of reflecting material as at 803 is provided to assure that whatever light enters the detector at 802 will be substantially equally divided between the two photo-cells. Should the two cells be arranged to directly face the beam, there would be possibility of false operation of the signals due to unpolarized light striking one cell and not the other. Instead of using reflecting strips, small reflecting areas or particles could be employed, or any other appropriate means to gain the separation of the beam, it being necessary, of course, that such means shall not so after the polarization of the light reaching cell 808 that the differential action of the device will be destroyed.

It will be apparent that the embodiment of my invention using polarized light can be employed with other arrangements set forth above. The light from the vehicular source can be monochromatic with an appropriate filter at the detector. Visible rays need not be used since other polarizable ones could be employed. The beam of light can be modulated or interrupted at a predetermined frequency and a frequency responsive relay employed as shown by Figure 6. Figure 7 shows a means for modulating a beam of light. The use of a combination of these also can be employed, whereby the operation of the signals will result from the receipt of light of a predetermined wave length, polarized in a particular manner and modulated or interrupted a definite number of times a second.

It will be understood that certain of the arrangements set out above with respect to one embodiment of my invention are obviously applicable to others as has, in part, been stated.

In certain of the claims of my invention the use of the word modulate, and forms thereof, will be understood to mean either modulate or interrupt, since interruption can be construed as 100% modulation.

Since certain changes may be made in the above construction and different embodiments of my invention without departing from the scope thereof, it is intended that all matter contained in the above description or shown in the accompanying drawings shall be interpreted as illustrative and not in a limiting sense.

This invention has been illustrated and described in connection with a system for controlling traffic signals. However, it is to be understood that the apparatus and principles of operation disclosed are applicable to other types of control system in which it is desired to operate remote mechanism by energy having particular characteristics.

What is claimed is:

1. A control system comprising, in combination, an electrical device, means to normally operate said device in a predetermined manner, means to operate said device in another predetermined manner, a source of sound of particular pitch modulated in a predetermined manner and means responsive to sound of said pitch modulated in said manner to cause last said device operating means to operate said device in second said manner.

2. A traffic control system comprising, in combination, a traffic signalling device, a vehicle, means on said vehicle to produce a sound of predetermined pitch modulated in a predetermined manner, a sound receiver responsive solely to sound of said pitch modulated in said manner to operate said traffic signalling device under control from said vehicle.

3. A traffic control system comprising, in combination, traffic signalling devices at a traffic intersection, means to operate said signalling devices to normally control traffic through said intersection, a vehicle, means on said vehicle to produce sound of a particular pitch modulated in a predetermined manner and means at said intersection responsive to sound of said particular pitch modulated in said predetermined manner to cause the normal operation of said signalling devices to be discontinued and to cause a predetermined signal display when said vehicle approaches said intersection.

4. A traffic control system including in combination a traffic signalling device, means to operate said device in response to a wave train of longitudinal vibrational disturbances in the air having predetermined characteristics as to wave length and modulation, and means to produce in the air such a wave train with said characteristics to operate first said means.

5. A traffic signalling system including in combination a traffic signalling device, a receiver responsive to a wave train of longitudinal vibrational disturbances in air having predetermined characteristics as to wave length and modulation and adapted to operate said signalling device upon receipt of said wave train for at least a minimum predetermined interval of time and not to operate said signalling device upon receipt of such a wave train with said characteristics for less than said minimum predetermined interval of time and means to produce such a wave train in air with said characteristics for an interval of time longer than above said minimum.

6. A traffic control system including traffic signalling means, means responsive to sound with a particular characteristic of pitch and modulation to cause a predetermined operation of said signalling means and responsive to sound with another particular characteristic to cause another predetermined operation of said signalling means and means to produce sound with either of said characteristics.

7. A traffic control system including traffic signalling means, means responsive to a wave train of particularly characterized longitudinal vibrational disturbances in the air to cause a predetermined operation of said signalling means, means responsive to a wave train of different particularly characterized longitudinal vibrational disturbances in air to cause a second predetermined operation of said signalling means and means to selectively produce wave trains of longitudinal vibrational disturbances in air having either of said particular characterizations.

8. A traffic control system including traffic signalling means, means responsive to a train of particularly characterized longitudinal vibrational disturbances in the air received from a predetermined direction to cause a predetermined operation of said signalling means, means responsive to such a train received from a second predetermined direction to cause a different predetermined operation of said signalling means and means to selectively produce such a train in either of said directions.

JUDSON O'D. SHEPHERD.